(12) United States Patent
Block

(10) Patent No.: US 9,684,479 B1
(45) Date of Patent: Jun. 20, 2017

(54) LABEL-MAKING TECHNIQUES AND SYSTEMS

(71) Applicant: Esselte IPR AB, Solna (SE)

(72) Inventor: David Block, El Cerrito, CA (US)

(73) Assignee: Esselte IPR AB, Solna (SE)

( * ) Notice: Subject to any disclaimer, the term of this patent is extended or adjusted under 35 U.S.C. 154(b) by 0 days.

(21) Appl. No.: 14/921,642

(22) Filed: Oct. 23, 2015

Related U.S. Application Data

(60) Provisional application No. 62/238,984, filed on Oct. 8, 2015.

(51) Int. Cl.
| | |
|---|---|
| *H04N 1/60* | (2006.01) |
| *G06F 3/12* | (2006.01) |
| *H04N 1/00* | (2006.01) |
| *H04N 1/50* | (2006.01) |
| *G06K 1/00* | (2006.01) |

(52) U.S. Cl.
CPC .......... *G06F 3/1243* (2013.01); *G06F 3/1208* (2013.01); *G06F 3/1284* (2013.01); *H04N 1/00392* (2013.01); *H04N 1/50* (2013.01)

(58) Field of Classification Search
CPC .... G06F 3/1243; G06F 3/1208; G06F 3/1284; H04N 1/00392; H04N 1/50
USPC ................ 358/1.9, 1.15, 537, 538, 539, 540
See application file for complete search history.

(56) References Cited

U.S. PATENT DOCUMENTS

| | | |
|---|---|---|
| 5,483,624 A | 1/1996 | Christopher et al. |
| 6,314,415 B1 | 11/2001 | Mukherjee |
| 6,665,587 B2 | 12/2003 | Leone, III et al. |
| 6,704,120 B1 | 3/2004 | Leone, III et al. |
| 7,172,113 B2 | 2/2007 | Olenick et al. |
| 7,219,836 B2 | 5/2007 | Newburry |
| 7,360,692 B2 | 4/2008 | Zellner et al. |

(Continued)

FOREIGN PATENT DOCUMENTS

| | | |
|---|---|---|
| CN | 201922651 U | 8/2011 |
| JP | 2001039067 A | 2/2001 |

(Continued)

OTHER PUBLICATIONS

LabelRIGHT Ultimate for Windows (Jul. 16, 2008), available at http://www.barcodehq.com/datasheets/lrwindowsultimateds.pdf (accessed on Dec. 5, 2016) (2 pages).

(Continued)

*Primary Examiner* — Quang N Vo
(74) *Attorney, Agent, or Firm* — Collard & Roe, P.C.

(57) ABSTRACT

In a method for adapting a label-making tool, a selection component may be presented via a user interface. The selection component may include a finite set of items corresponding to types of objects for labels. User input selecting an item corresponding to a type of label object may be received. Data-acquisition actions performable by the label-making tool to obtain data for the label object may be identified based on the type of the label object. A selection component including a finite set of items corresponding to the data-acquisition actions may be presented. User input selecting an item corresponding to a data-acquisition action may be received. The workflow of a label-making tool may be adapted to include the data-acquisition action. The tool may be configured to perform the data-acquisition action to generate a label including the obtained data.

35 Claims, 10 Drawing Sheets

(56) References Cited

U.S. PATENT DOCUMENTS

| | | |
|---|---|---|
| 7,421,645 B2 | 9/2008 | Reynar |
| 7,577,618 B2 | 8/2009 | Raju et al. |
| 7,668,619 B2 | 2/2010 | Torian |
| 7,712,024 B2 | 5/2010 | Reynar et al. |
| 7,796,292 B2 | 9/2010 | Khoshatefeh et al. |
| 8,543,903 B2 | 9/2013 | Malkin et al. |
| 8,548,921 B2 | 10/2013 | Raju et al. |
| 9,116,641 B2 | 8/2015 | Caveney, Jr. et al. |
| 9,292,243 B2 * | 3/2016 | Jacobs .................. B41J 3/4075 |
| 9,443,326 B2 | 9/2016 | Krumm et al. |
| 2002/0095347 A1 * | 7/2002 | Cummiskey ....... G06Q 30/0601 705/26.1 |
| 2004/0001099 A1 | 1/2004 | Reynar et al. |
| 2004/0125405 A1 | 7/2004 | Salomon et al. |
| 2005/0237556 A1 | 10/2005 | Watkins |
| 2006/0123331 A1 | 6/2006 | Hightower et al. |
| 2009/0219574 A1 | 9/2009 | Cameron et al. |
| 2010/0328714 A1 * | 12/2010 | Allen ................. G06F 3/04847 358/1.15 |
| 2012/0215571 A1 | 8/2012 | Bracken |
| 2013/0050719 A1 | 2/2013 | Ito |

FOREIGN PATENT DOCUMENTS

| | | |
|---|---|---|
| JP | 5538011 B2 | 7/2014 |
| KR | 20130083049 A | 7/2013 |
| WO | WO-2005079341 A2 | 9/2005 |

OTHER PUBLICATIONS

IDG Enterprise, Computerworld, vol. 26, No. 14, Apr. 6, 1992 (4 pages: Cover page and pp. 90, 91, and 97).

* cited by examiner

LABEL-MAKING TECHNIQUES AND SYSTEMS

CROSS REFERENCE TO RELATED APPLICATION(S)

This application claims priority and benefit under 35 U.S.C. 119(e) of U.S. Provisional Patent Application No. 62/238,984, titled "Label-Making Techniques and Systems" and filed on Oct. 8, 2015, which is hereby incorporated by reference to the maximum extent permitted by applicable law.

FIELD OF INVENTION

The present disclosure relates generally to techniques and systems for making labels. Some embodiments relate specifically to techniques and systems for generating workflows that can be performed to make labels based on templates.

BACKGROUND

Labels are often used to convey information about various objects (e.g., product labels affixed to products or printed on product packaging) or people (e.g., identification badges for employees of a company or visitors to a facility). Examples of identification badges include paper or plastic badges on which the information about the badge-holder is printed, for example, the badge-holder's name, picture, and/or employer. In some cases, an identification badge may be affixed to the badge-holder's clothing, for example, by an adhesive, a clip, a pin, or magnets. Some identification badges encode information that can be used to obtain access to areas of a facility, services, accounts, etc. Such information may be encoded, for example, in a barcode, Quick Response code ("QR code"), radio-frequency identification ("RFID") tag, etc.

Some labels are generated using specialized label-making software. Such software generally allows the software's operator to specify at least some of the label's content before making (e.g., printing) the label. For example, software for generating identification badges may allow the operator to specify the badge-holder's name.

SUMMARY OF THE INVENTION

The inventor has recognized and appreciated that some label-making tasks are difficult to perform using conventional label-making software, including many commercial office labeling products. These conventional applications generally allow great latitude in specifying the label's constituent objects and the manner in which the label's objects are arranged, yet fall short of providing easy-to-use tools for specifying or driving a customized workflow to populate the labels' objects and generate the populated labels. This lack of adaptability and customization often leads to the development of custom applications for specific domains of the labeling industry, including visitor management, wine cellar tracking, returned product tracking, etc. These customized applications generally use an "API" (Application Program Interface) provided by the label-making software to simplify the often complex task of generating attractive, formatted labels. Although an API can simplify some of the tasks involved in creating such customized applications, some expertise in computer programming is generally required to generate customized label-making applications using an API.

Thus, there is a need for label-making systems and techniques that are easy for non-programmers to use, but also flexible enough to support a wide variety of labeling needs, with varying label content, and customizable workflows for generating labels. Some embodiments of the label-making systems and techniques described herein may be flexible and easy to use. In some embodiments, a label-making system presents an interface through which a label designer can configure a template and/or a workflow for generating labels based on a template. The system's interface may be easy to use, because the system may present the label designer with a limited set of design options (e.g., a limited set of actions the label-making tool can perform, limits on the stages of label-making during which the actions can be performed, a limited set of types of label objects, and/or a limited set of techniques for collecting data for the label's objects). However, the system may be flexible and powerful, thereby allowing label designers to easily create a wide variety of tools for making attractive, formatted labels, because the available design options may be suitable for a wide variety of layouts, content, and workflows.

According to an aspect of the present disclosure, a method for adapting a label-making tool is provided. The method includes presenting, via a user interface, a selection component including a finite set of items corresponding to respective types of objects for labels, and receiving user input selecting an item corresponding to a type of label object. The method further includes identifying, based on the type of the label object, data-acquisition actions performable by the label-making tool to obtain data for the label object, and presenting, via the user interface, a selection component including a finite set of items corresponding to the respective data-acquisition actions. The method further includes receiving user input selecting an item corresponding to a data-acquisition action, and adapting a workflow of the label-making tool to include the data-acquisition action. The adapted label-making application is configured to perform operations including obtaining data for the label object by performing the data-acquisition action, and generating a label including the obtained data.

In some embodiments, the label-making tool includes a template and the workflow, the workflow is performable to generate a label based on the template, and the template includes the label object. In some embodiments, the types of label objects are selected from the group consisting of an address type, a text type, a code type, a date type, a time type, a date/time type, a counter type, and a graphics type. In some embodiments, the type of the label object is the address type, and the data-acquisition actions performable to obtain data for the label object are selected from the group consisting of receiving keyed input representing an address, receiving speech input representing an address, scanning a business card and extracting an address from the scanned business card, and retrieving an address from a data set based on other data obtained for the label. In some embodiments, the type of the label object is the text type, and the data-acquisition actions performable to obtain data for the label object are selected from the group consisting of receiving keyed input, receiving speech input, receiving user input selecting a text item from a finite set of text items, and receiving user input selecting a data source from a finite set of data sources. In some embodiments, the type of the label object is the code type, and the data-acquisition actions performable to obtain data for the label object are selected from the group consisting of receiving keyed input, receiving user input selecting an item from a finite set of items, and receiving user input selecting a data source from a finite set of data sources, and wherein generating a label including the obtained data includes generating a label including a code based on the obtained data. In some embodiments, the finite set of data sources includes one or more label objects of the label.

In some embodiments, the type of the label object is the date type, and the data-acquisition actions performable to obtain data for the label object are selected from the group consisting of querying a computer system for a current date, calculating a date range based on the current date, calculating a second date based on the current date, and receiving user input representing a date. In some embodiments, the type of the label object is the time type, and the data-acquisition actions performable to obtain data for the label object are selected from the group consisting of querying a computer system for a current time-of-day, calculating a time range based on the current time-of-day, calculating a second time-of-day based on the current time-of-day, and receiving user input representing a time-of-day. In some embodiments, the type of the label object is the date/time type, and the data-acquisition actions performable to obtain data for the label object are selected from the group consisting of querying a computer system for a current date and time-of-day, calculating a date and time range based on the current date and time-of-day, calculating a second date and time-of-day based on the current date and time-of-day, and receiving user input representing a date and time-of-day.

In some embodiments, the type of the label object is the counter type, and the data-acquisition actions performable to obtain data for the label object include loading a counter value, generating the object data based on the counter value, changing the counter value, and storing the changed counter value. In some embodiments, the type of the label object is the graphics type, and the data-acquisition actions performable to obtain data for the label object are selected from the group consisting of obtaining an image by activating a camera and receiving user input selecting an image from a finite set of images.

In some embodiments, the method further includes presenting, via the user interface, a selection component including a finite set of items corresponding to respective initial actions performable prior to performing the data-acquisition action, receiving user input selecting at least one of the items corresponding to at least one of the initial actions, and adapting the label-making tool to perform the initial action(s) prior to performing the data-acquisition action. In some embodiments, the initial action(s) are selected from the group consisting of clearing data previously obtained for the label, clearing data previously obtained for the label object, displaying, via the user interface, a message dialog component, and determining a property of the label. In some embodiments, determining the property of the label includes presenting, via another user interface, a selection component including a finite set of items corresponding to respective properties of labels, and receiving user input selecting at least one of the items corresponding to at least one of the label properties.

In some embodiments, the method further includes presenting, via the user interface, a selection component including a finite set of items corresponding to respective terminal actions performable subsequent to performing the data-acquisition action, receiving user input selecting at least one of the items corresponding to at least one of the terminal actions, and adapting the label-making tool to perform the terminal action(s) subsequent to performing the data-acquisition action. In some embodiments, the terminal action(s) are selected from the group consisting of printing the label, storing data obtained for the label, and sending a message to a specified user.

In some embodiments, the operations further include obtaining other data for another label object by performing a corresponding data-acquisition operation, and the generated label further includes the other data. In some embodiments, the method further includes adapting the label-making tool to control an appearance of the label based, at least in part, on a property of the label. In some embodiments, the label-making tool is further configured to execute in a kiosk mode in which the label-making tool prompts a user for security data in response to the user attempting to terminate execution of the label-making tool.

According to another aspect of the present disclosure, a system is provided. The system includes at least one data processing device programmed to perform acts including presenting, via a user interface, a selection component including a finite set of items corresponding to respective types of objects for labels, and receiving user input selecting an item corresponding to a type of label object. The operations further include identifying, based on the type of the label object, data-acquisition actions performable by a label-making tool to obtain data for the label object, and presenting, via the user interface, a selection component including a finite set of items corresponding to the respective data-acquisition actions. The operations further include receiving user input selecting an item corresponding to a data-acquisition action, and adapting a workflow of the label-making tool to include the data-acquisition action. The adapted label-making tool is configured to perform operations including obtaining data for the label object by performing the data-acquisition action, and generating a label including the obtained data.

In some embodiments, the label-making tool includes a template and the workflow, the workflow is performable to generate a label based on the template, and the template includes the label object. In some embodiments, the types of label objects are selected from the group consisting of an address type, a text type, a code type, a date type, a time type, a date/time type, a counter type, and a graphics type.

In some embodiments, the acts further include presenting, via the user interface, a selection component including a finite set of items corresponding to respective initial actions performable prior to performing the data-acquisition action, receiving user input selecting at least one of the items corresponding to at least one of the initial actions, and adapting the label-making tool to perform the initial action(s) prior to performing the data-acquisition action. In some embodiments, the initial action(s) are selected from the group consisting of clearing data previously obtained for the label, clearing data previously obtained for the label object, displaying, via the user interface, a message dialog component, and determining a property of the label.

In some embodiments, the acts further include: presenting, via the user interface, a selection component including a finite set of items corresponding to respective terminal actions performable subsequent to performing the data-acquisition action, receiving user input selecting at least one of the items corresponding to at least one of the terminal actions, and adapting the label-making tool to perform the terminal action(s) subsequent to performing the data-acquisition action. In some embodiments, the terminal action(s) are selected from the group consisting of printing the label, storing data obtained for the label, and sending a message to a specified user.

According to another aspect of the present disclosure, a computer-readable storage medium is provided. The storage medium has instructions stored thereon that, when executed by a data processing device, cause the data processing device to perform acts including presenting, via a user interface, a selection component including a finite set of items corresponding to respective types of objects for labels, and receiving user input selecting an item corresponding to a type of label object. The acts further include identifying, based on the type of the label object, data-acquisition actions performable by a label-making tool to obtain data for the label object, and presenting, via the user interface, a selection component including a finite set of items corresponding to the respective data-acquisition actions. The acts further include receiving user input selecting an item corresponding to a data-acquisition action, and adapting a workflow of the label-making tool to include the data-acquisition action. The adapted label-making tool is configured to perform operations including obtaining data for the label object by performing the data-acquisition action, and generating a label including the obtained data.

In some embodiments, the label-making tool includes a template and the workflow, the workflow is performable to generate a label based on the template, and the template includes the label object. In some embodiments, the types of label objects are selected from the group consisting of an address type, a text type, a code type, a date type, a time type, a date/time type, a counter type, and a graphics type.

In some embodiments, the acts further include presenting, via the user interface, a selection component including a finite set of items corresponding to respective initial actions performable prior to performing the data-acquisition action, receiving user input selecting at least one of the items corresponding to at least one of the initial actions, and adapting the label-making tool to perform the initial action(s) prior to performing the data-acquisition action. In some embodiments, the initial action(s) are selected from the group consisting of clearing data previously obtained for the label, clearing data previously obtained for the label object, displaying, via the user interface, a message dialog component, and determining a property of the label.

In some embodiments, the acts further include presenting, via the user interface, a selection component including a finite set of items corresponding to respective terminal actions performable subsequent to performing the data-acquisition action, receiving user input selecting at least one of the items corresponding to at least one of the terminal actions, and adapting the label-making tool to perform the terminal action(s) subsequent to performing the data-acquisition action. In some embodiments, the terminal action(s) are selected from the group consisting of printing the label, storing data obtained for the label, and sending a message to a specified user.

Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1A:
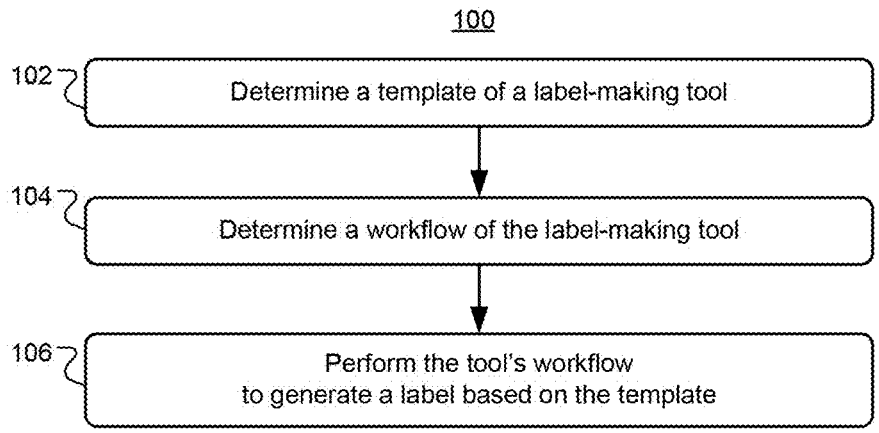
FIG. 1A is a flowchart of a method for generating a label, according to some embodiments.

FIG. 1A illustrates a method 100 for generating a label, in accordance with some embodiments. The label may be generated by a label-making tool, which may include a label template and a label-making workflow. In a first sub-process 102, the tool's template is determined. The template may identify the objects that are included in the label and indicate how those objects are arranged. In a second sub-process 104, the tool's workflow is determined. The workflow may identify actions that the tool can perform to generate a label based on the template. In some embodiments, the workflow indicates an order (e.g., a partial order or a total order) in which the tool is to perform the label-generating actions. In a third sub-process 106, the tool performs the workflow to generate a label based on the template. The method 100 may be performed by one or more processing devices, as described in further detail below. In some embodiments, the tool's template may be determined based on inputs received from one or more label template designers. In some embodiments, the tool's workflow may be determined based on inputs received from one or more label workflow designers. In some embodiments, the tool's workflow may be performed based on inputs received from one or more users.

In the first sub-process 102, the tool's template is determined. In some embodiments, an existing template is selected (e.g., from a library of label templates) and used, without modification, as the tool's template. In some embodiments, an existing template is modified, and the modified template is used as the tool's template. In some embodiments, a new template is created, configured, and used as the tool's template.

In some embodiments, a template specifies properties of a label's objects. Such properties may include, without limitation, an object's visual properties, geometric properties, and/or type. An object's visual properties may include text properties (e.g., font, size, color, etc.), image properties, and/or any other suitable properties that control or affect the object's appearance. An object's geometric properties may include the object's size, shape, position, orientation, etc. An object's type may represent constraints on the type of data that a label-making tool will use to populate the object, constraints on the data-acquisition actions that a label-making tool will perform to obtain data to populate the object, and/or any other suitable constraints on the object.

Some examples of object types may include an address type, a text type, a code type, a date type, a time type, a date/time type, a graphics type, a counter type, or any other suitable type. The address object type may be suitable for an object that the label designer intends to be populated with an address (e.g., email address, street address, etc.). In some embodiments, a label-making tool may acquire data to populate an object of the address type by performing one or more of the following data-acquisition actions: receiving input (e.g., keyed input or speech input) representing an address, scanning a business card (or other document) and extracting an address from the scanned data, and/or retrieving an address from a data set (e.g., a contact list or an address book). Data retrieved from a data set may, for example, be selected by a user of the label-making tool, be selected by the label-making tool based on other data obtained for the label (e.g., a name or telephone number), etc. Keyed input may include, without limitation, input data received from a physical or virtual keyboard or keypad. Speech input may include, without limitation, audio data obtained via a microphone (e.g., audio data representing the user's speech) or text data generated by an automatic speech recognition (ASR) tool (e.g., text transcribed from the user's speech by speech recognition software). Regarding the retrieval of an address from a data set, a label-making tool may maintain or be configured to access a data set (e.g., a contact list or an address book) that stores addresses in connection with names, telephone numbers, and/or other information of people or entities that reside at, work at, or use those addresses.

The text object type may be suitable for an object that the label designer intends to be populated with text. In some embodiments, a label-making tool may acquire data to populate an object of the text type by performing one or more of the following data-acquisition actions: receiving input (e.g., keyed input or speech input), scanning a business card (or other document) and extracting a specified field (e.g., name, title, company name, phone number, etc.) from the scanned data, receiving user input selecting a text item from a finite set of text items, and/or receiving user input selecting a data source from a finite set of data sources. In the latter case, the text data may then be obtained from the selected data source.

The code object type may be suitable for an object that the label designer intends to be populated with a code (e.g., barcode, QR code, etc.). In some embodiments, a label-making tool may acquire data to populate an object of the code type by performing one or more of the following data-acquisition actions: receiving keyed input and generating or selecting a code based on the keyed input, receiving user input selecting an item from a finite set of items and generating or selecting a code based on the selected item, and/or receiving user input selecting a data source from a finite set of data sources and generating or selecting a code based on the selected data source. For example, a visitor to an office building may select the name of an organization the visitor plans to visit, and the label-making tool may select a barcode or QR code that the visitor can use to access the selected organization's lobby. In some embodiments, the code object's data source can be the contents of another label object (the "referenced object" or "linked object") (e.g., a text or address object), and the code object can encode the contents (e.g., text data) of the referenced object, thereby generating a machine readable representation of the referenced object's contents.

The date object type may be suitable for an object that the label designer intends to be populated with a date or range of dates. In some embodiments, a label-making tool may acquire data to populate an object of the date type by performing one or more of the following data-acquisition actions: querying a computer system (e.g., an operating system of a computer, application software executing on a computer, a network-based software service, etc.) for a date (e.g., the current date), receiving keyed input representing a date or date range, receiving user input selecting a date or date range in a digital calendar or other selection component of a user interface, and/or determining a date range or a date of interest based on the date obtained from the computer system or the user. The process used to calculate the date range or date of interest may be specified by the label designer. As just one example, a label designer may configure a label-making tool to generate a food packaging label, and to populate a date object on the label with the food's expiration date. If the food expires two weeks from the date of packaging, the label designer may configure the tool to determine the expiration date by obtaining the current date and adding two weeks to it. Other processes for determining a date are possible.

The time object type may be suitable for an object that the label designer intends to be populated with a time (e.g., a time of day) or range of times. In some embodiments, a label-making tool may acquire data to populate an object of the time type by performing one or more of the following data-acquisition actions: querying a computer system for a time (e.g., the current time-of-day), receiving keyed input representing a time or time range, receiving user input selecting a time or time range in a selection component (e.g., a selection wheel) of a user interface, and/or determining a time range or a time of interest based on the time obtained from the computer system or the user.

The date/time object type may be suitable for an object that the label designer intends to be populated with a date, time and/or range of dates/times. In some embodiments, a label-making tool may acquire data to populate an object of the date/time type by performing one or more of the following data-acquisition actions: querying a computer system for a date (e.g., the current date) and/or time (e.g., the current time-of-day), receiving keyed input representing a date, time, and/or range of dates/times, receiving user input selecting a date, time, and/or range of dates/times in a selection component of a user interface, and/or determining a date/time range or a date/time of interest based on the date/time obtained from the computer system or the user.

The graphics object type may be suitable for an object that the label designer intends to be populated with one or more graphics (e.g., pictures, other images, or any suitable graphic content). In some embodiments, a label-making tool may acquire data to populate an object of the graphics type by performing one or more of the following data-acquisition actions: obtaining an image by activating a camera and/or receiving user input selecting an image from a finite set of images.

The counter object type may be suitable for objects that are intended to be populated based on the value of a counter. For example, a label-making tool may maintain a counter. The counter may represent, for example, the number of labels that have been made by the tool (e.g., the total number of labels, the number of labels with a specified property, the number of labels made during a specified time period, the number of labels made since a specified event or since the counter was reset, etc.). Examples of suitable time periods may include one or more hours, days, weeks, months, or years. In some embodiments, the label-making tool may populate an object with a value (e.g., a unique value) equal to the value of the counter or based on the value of the counter. The unique value may, for example, be used as an identification number for a label that functions as an identification badge, as a ticket number for a label that functions as a ticket, as a serial number for a product label, etc. In some embodiments, a label-making tool may acquire data to populate an object of the counter type by performing one or more of the following data-acquisition actions: loading a counter value and/or generating the object value based on the counter value. The counter value may be loaded by reading from a computer-readable storage medium, by querying a database, etc. In some embodiments, the label-making tool may change (e.g., increment) the counter value and store the changed value after a specified event occurs (e.g., after a label is generated).

The foregoing examples of object types for labels are not limiting. In some embodiments, the address object, text object, code object, date object, time object, date/time object, graphics object, and counter object may be the only types of objects that can be included in the layout for a label to be made by the label-making tool. In some embodiments, other types of objects are possible.

Figure 1B:
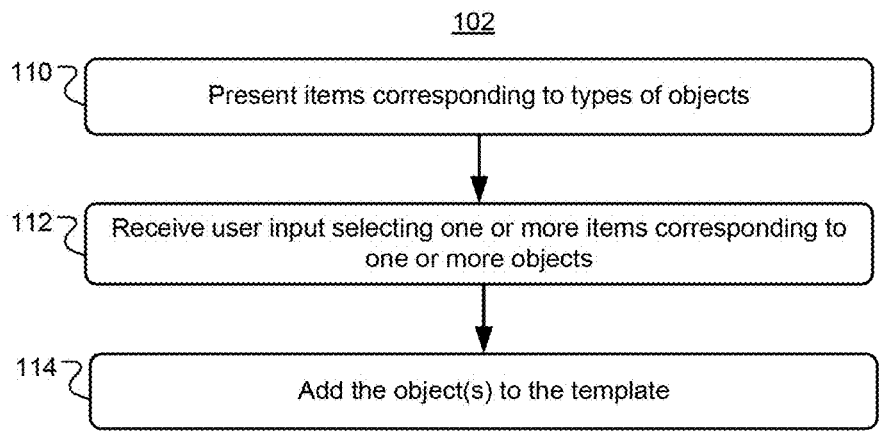
FIG. 1B is a flowchart of a sub-process for determining a template of a label-making tool, in accordance with some embodiments.

FIG. 1B illustrates a sub-process 102 for determining a label-making tool's template, according to some embodiments. In a first step 110, items corresponding to objects of different types are presented. In a second step 112, input is received from the label designer, selecting one or more of the items corresponding to objects of particular types. In a third step 114, the selected objects are added to the template.

The items may be presented and the input may be received via a user interface of a computer, as described in further detail below. In some embodiments, the items may be presented via a selection component of the user interface, and the label designer may select the item(s) corresponding to object(s) of different types by interacting with the selection component. Examples of suitable selection components may include, without limitation, dropdown menus, checkboxes, radio buttons, list boxes (e.g., multi-selection list boxes), toggle switches, etc. For example, in the first step 112, the system may present a selection component with items corresponding to address objects, text objects, code objects, date objects, time objects, date/time objects, graphic objects, and counter objects.

In some embodiments, the template-determination sub-process 102 may include a step (not shown) in which the system receives inputs specifying properties (e.g., visual properties, geometric properties, etc.) of the objects, and configures the objects to exhibit the specified properties. These inputs may be provided by the label designer via a user interface.

In the second sub-process 104 of the method 100, the tool's workflow is determined. In some embodiments, the workflow identifies the operations that are performed by the tool to generate a label. These label-generating actions may include one or more initial actions, one or more data-acquisition actions, and/or one or more terminal actions. The initial action(s), when performed, may prepare the tool to obtain data to populate the label's objects. By performing the data-acquisition action(s), the tool may obtain data and use the data to populate the label's objects. The terminal action(s), when performed, may produce (e.g., print) the populated label and conclude the label-making process.

In some embodiments, the workflow specifies an order (e.g., a partial order or a total order) in which the tool is to perform the label-generating actions. In some embodiments, the ordering indicates that the initial action(s) are performed before performing the data-acquisition action(s), and indicates that the data-acquisition action(s) are performed before performing the terminal action(s). In some embodiments, the ordering indicates the order in which the data-acquisition operations are performed to obtain data for the label's objects. Other orderings of the workflow's actions are possible. In some embodiments, an initial action may be performed in parallel with a data-acquisition action but prior to the terminal actions. In some embodiments, a terminal action may be performed in parallel with a data-acquisition action but subsequent to the initial actions.

Figure 1C:
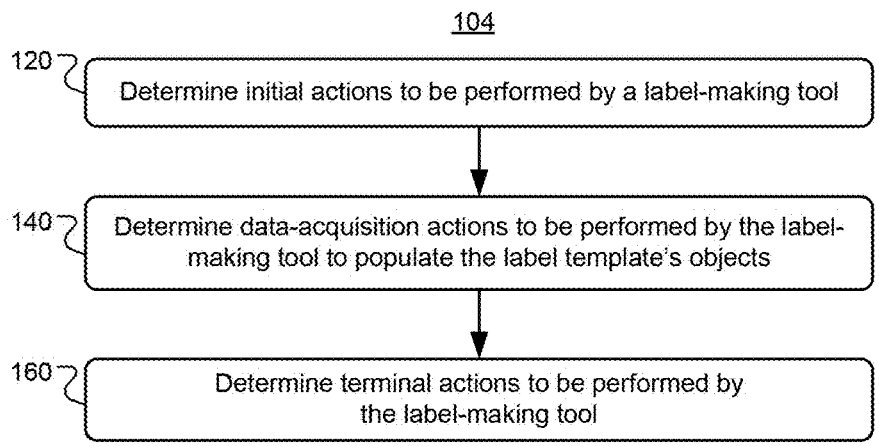
FIG. 1C is a flowchart of a sub-process for determining a workflow of a label-making tool, in accordance with some embodiments.

FIG. 1C illustrates a sub-process 104 for determining the workflow of a label-making tool, according to some embodiments. The workflow-determination sub-process 104 may be performed by one or more processing devices, as described in further detail below.

In some embodiments, the workflow-determination sub-process 104 includes sub-processes 120-160. In the first sub-process 120, one or more initial actions to be performed by a label-making tool are determined. In the second sub-process 140, one or more data-acquisition actions to be performed by the tool are determined. In the third sub-process 160, one or more terminal actions to be performed by the label-making tool are determined. Some embodiments of the sub-processes 120-160 of the sub-process 104 for determining the workflow of a label-making tool are described in further detail below.

One or more initial actions to be performed by the label-making tool may be identified in the first sub-process 120. In some embodiments, the initial actions prepare the tool to obtain data to populate the label's objects. The initial actions performable by a label-making tool may include clearing data previously obtained by the label-making tool (e.g., user-specific data for one or more objects of a previously-made label, etc.). In scenarios where the label-making tool is used repeatedly to make multiple labels, clearing data (e.g., user-specific data) previously obtained by the tool prior to making a new label may enhance the security and accuracy of the label-making tool, in addition to avoiding confusion.

In some embodiments, the initial actions performable by a label-making tool may include presenting a message via a user interface. Such a message may, for example, greet the tool's user, orient the user to the label-making tool, guide the user in the proper use of the label-making tool, etc. The message may include, without limitation, text data, audio data, image data, video data, and/or any other suitable data. In some embodiments, the message data is selected by the label designer or provided by the label designer in the first sub-process 120.

In some embodiments, the initial actions performable by a label-making tool may include determining one or more properties (or property values) of the label to be generated.

A label's properties may be determined, for example, based on user input. In some embodiments, a label-making tool may control the appearance of a label based, at least in part, on the label's properties. For example, based on the label's properties, the label-making tool may populate one or more objects of the label, control the properties of the label's text (e.g., font, color, size, etc.), adjust the geometry (e.g., position, size, orientation, etc.) of the label's objects, and/or perform any other suitable operation.

For example, a label-making tool that is configured to generate identification badges may prompt the user to specify the type of individual for whom the identification badge is being generated (e.g., a visitor, an employee, a contractor, etc.). In this scenario, the "type of individual" identified by the badge is a property of the badge. When making the badge, the label-making tool may, for example, populate a text object with the word "VISITOR" for a visitor badge or the word "CONTRACTOR" for a contractor badge, and populate a code object with a barcode that allows the individual to access a lobby area (for a visitor badge) or a restricted area (for a contractor badge). Some examples of techniques for determining one or more properties of a label and for determining the appearance of a label based on the label's properties are described herein.

The foregoing examples of initial actions performable by a label-making tool are not limiting. In some embodiments, clearing data, presenting a message, determining one or more properties of the label, and/or determining the appearance of a label based on the label's properties may be the only initial actions that a label-making tool can perform. In some embodiments, other initial actions are possible.

Figure 2A:
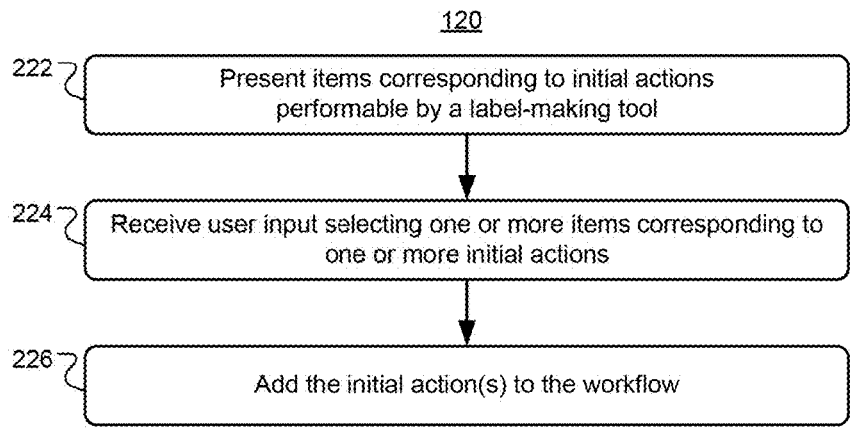
FIG. 2A is a flowchart of a sub-process for determining initial actions of a workflow of a label-making tool, according to some embodiments.

FIG. 2A shows an embodiment of the first sub-process 120 for determining initial actions to be performed by a label-making tool. In a first step 222, items corresponding to initial actions performable by a label-making tool are presented. In a second step 224, input is received from the label designer, specifying one or more items corresponding to one or more initial actions.

The items may be presented and the input may be received via a user interface of a computer, as described in further detail below. In some embodiments, the items may be presented via a selection component of the user interface, and the label designer may select the item(s) corresponding to initial action(s) by interacting with the selection component. For example, in the first step 222, the system may present a selection component with items corresponding to clearing data (e.g., for the label or for a specified set of the label's objects), presenting a message, determining properties of the label, and/or determining the appearance of a label based on the label's properties.

In cases where the label designer configures the label-making tool to perform an initial act of presenting a message, the label designer may provide the message data in the second step 224. In cases where the label designer configures the label-making tool to perform an initial act of determining a property of the label, the label designer may specify a selection component to be presented via a user interface of the label-making tool to obtain input from the user regarding the properties (or property values) of the label. The label designer may specify the items to be included in the selection element (e.g., the possible properties of the label).

In a third step 226, the selected initial action(s) may be added to the workflow. In some embodiments, the workflow may be configured to perform the initial actions in the order the actions are added to the workflow. In some embodiments, the label designer may adjust, via a user interface, the order in which workflow performs the initial actions.

Returning to FIG. 1C, in the second sub-process 140, one or more data-acquisition actions to be performed by the tool as part of the label-making workflow are determined. In some embodiments, the workflow may specify, for at least one of the label's objects (e.g., a specified object, a specified subset of the label's objects, or all of the label's objects), one or more data-acquisition actions suitable for obtaining data for the object. The label-making tool may use the obtained data to populate the corresponding objects. In some embodiments, the workflow specifies the order in which the label-making tool performs the data-acquisition actions for the label's objects. In some embodiments, the data for one or more of the label's objects may be specified by the label designer (e.g., as part of the label template), and not disturbed or overwritten by the workflow.

Figure 2B:
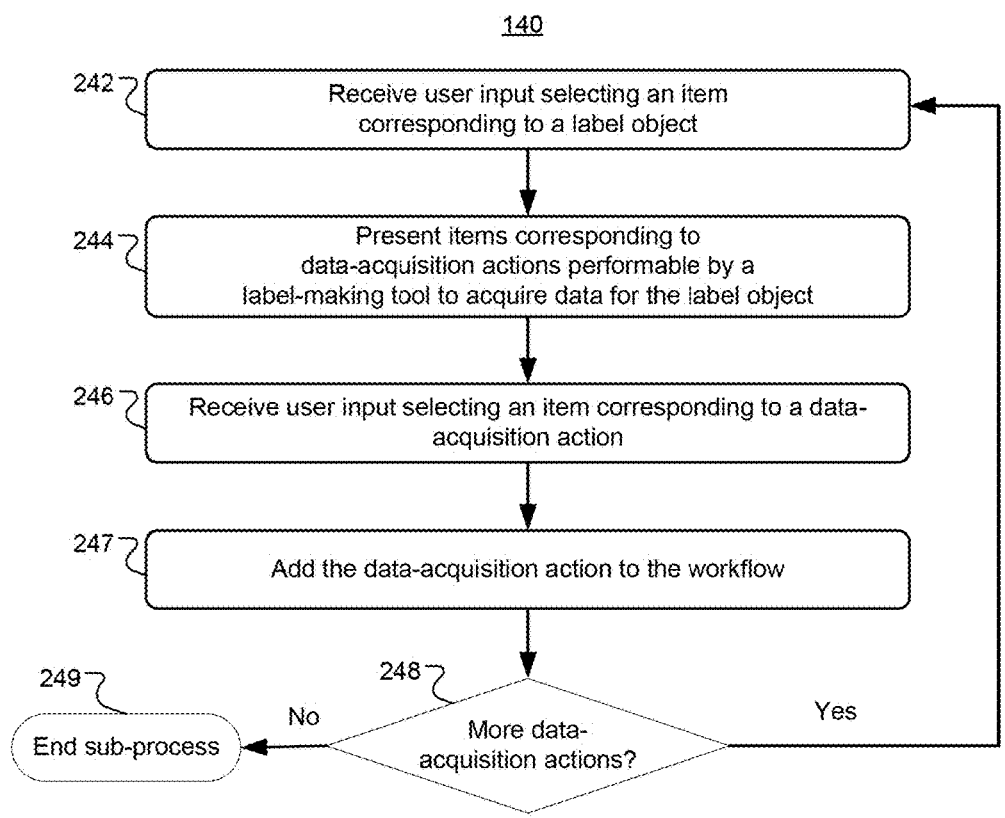
FIG. 2B is a flowchart of a sub-process for determining data-acquisition actions of a workflow of a label-making tool, according to some embodiments.

FIG. 2B shows an embodiment of the second sub-process 140 for determining one or more data-acquisition actions to be performed by the tool as part of the label-making workflow. In a first step 242, input is received from the label designer, selecting an item corresponding to one of the label objects. In a second step 244, items corresponding to data-acquisition actions are presented (e.g., via a user interface). The data-acquisition actions presented are those that are performable by the label-making tool to obtain data for the selected label object. In a third step 246, input is received from the label designer, specifying at least one item corresponding to a data-acquisition action. In a fourth step 247, the specified data-acquisition action is added to the workflow. In some embodiments, the workflow may be configured to perform the data-acquisition actions in the order the actions are added to the workflow. In some embodiments, the label designer may adjust, via a user interface, the order in which workflow performs the data-acquisition actions.

In a fifth step 248, the system determines whether the label designer wishes to add one or more additional data acquisition actions to the workflow. If so, steps 242-247 are repeated, thereby allowing the label designer to add another data-acquisition action for the workflow. Otherwise, the sub-process 140 ends (249). The system may determine whether the label designer wishes to add one or more additional data acquisition actions to the workflow based, at least in part, on input provided by the label designer.

In the example of FIG. 2B, the items corresponding to objects and data-acquisition actions may be presented and the label designer's input may be received via a user interface of a computer, as described in further detail below. In some embodiments, the items may be presented via a selection component of the user interface, and the label designer may select an item corresponding to an object or a data-acquisition action by interacting with the selection component. For example, the system may present a selection component (or other user interface component) with items corresponding to objects included in the label template, and in the first step 242, the label designer may select an item corresponding to a label object (e.g., a date-type object). In the second step 244, the system may present a selection component with items corresponding to data-acquisition actions suitable for the date-type object (e.g., querying a computer system for a date, receiving keyed input representing a date or date range, receiving user input selecting a date or date range in a digital calendar or other selection component of a user interface, and/or determining a date range or a date of interest based on the date obtained from the computer system or the use),r and in the third step 246, the system may receive input selecting one of those items.

In this way, the label designer may specify the data-acquisition actions that will be performed to populate the label's objects.

Figure 3:
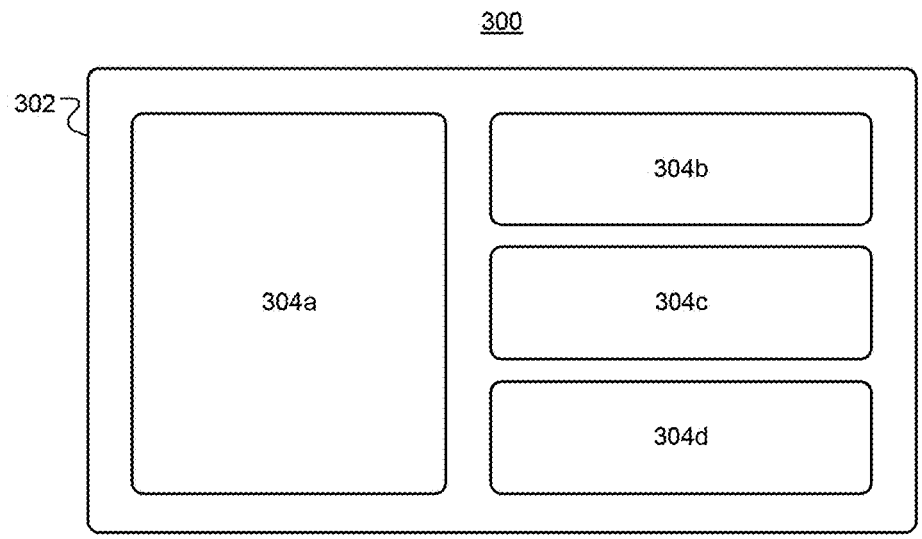
FIG. 3 is a block diagram of a user interface component for specifying a template and/or a workflow of a label-making tool, according to some embodiments.

In some embodiments, the sub-process 102 for determining a label's template and/or the sub-process 104 for determining a label's workflow may be performed in connection with a template/workflow component, which may be presented via a user interface. An embodiment of a template/workflow component 300 is illustrated in FIG. 3. As can be seen, the template/workflow component 300 may include a label component 302 indicating attributes of the label, including, without limitation, the label's shape, the label's size, initial actions included in the label's workflow, terminal actions included in the label's workflow, and/or an ordering of the workflow's actions. In some embodiments, the template/workflow component 300 includes one or more object components 304 representing the label's objects. An object component may indicate properties of the object represented by the component, including, without limitation, the object's visual properties, the object's geometric properties, the object's type, and/or the data-acquisition action(s) associated with the object.

In some embodiments, input from the label designer specifying an object's geometric properties, visual properties, and/or type may be received via the template/workflow component (e.g., in sub-process 102). In some embodiments, the label designer may adjust an object's geometric properties by moving or resizing the object component 304 corresponding to the object. In some embodiments, the label designer may adjust an object's visual properties by opening a menu associated with the object component 304 representing the object and setting the values of parameters representing the object's visual properties. In some embodiments, the label designer may specify an object's type by opening a selection component associated with the object component 304 corresponding to the object and selecting an item in the selection component representing the object's type.

In some embodiments, input from the label designer specifying the data-acquisition action(s) to be performed to obtain data for an object may be received via the template/workflow component (e.g., in sub-process 140). In some embodiments, the label designer may specify the data-acquisition action(s) for an object by opening a selection component associated with the object component 304 corresponding to the object and selecting one or more items in the selection component representing the desired data-acquisition action(s).

In some embodiments, input from the label designer specifying the initial and/or terminal action(s) to be included in the label-making workflow may be received via the template/workflow component (e.g., in sub-processes 120 and 160). In some embodiments, the label designer may specify the initial and/or terminal action(s) for a label's workflow by opening a selection component associated with the label component 302 corresponding to the label and selecting one or more items in the selection component representing the desired action(s).

In some embodiments, input from the label designer specifying an ordering of the actions for the label's workflow may be received via the template/workflow component. In some embodiments, a label designer may manually assign a workflow ordering to the initial actions, the terminal actions, and/or the data-acquisition actions. In some embodiments, the workflow ordering for the data-acquisition actions may be assigned automatically based on the relative positions of the label's objects and/or based on the order in which the object components were added to the template/workflow component. For example, the data-acquisition actions for the label's objects may be performed in the same order in which the corresponding object components were added to the template/workflow component. In some embodiments, the label designer can adjust the order of workflow actions via a drag-and-drop interface or via manual renumbering of an action processing order.

In some embodiments, user input identifying one or more objects to be populated based on properties (or property values) of the label may be received via the template/workflow component. As described above, a label-making tool may be configured to control the appearance of an object based on the label's properties. In some embodiments, the user may specify the relationship between a label property and the value(s) of one or more objects by selecting the corresponding object component 304, accessing a selection component (e.g., a check box) associated with the object component 304, and selecting an item in the selection component indicating that the object's value depends on the label's property. When this item is selected, the user may be prompted to specify property-specific data for the label. In the example of the identification badge, the user may be prompted to enter, for each value of the badge's "type of individual" property, the text that will appear in a text object and the code that will appear in the code object when the corresponding property value is selected (e.g., "CONTRACTOR", "VISITOR", etc.).

Returning to FIG. 1C, in the third sub-process 160, one or more terminal actions to be performed by the tool as part of the label-making workflow are determined. The terminal actions performable by a label-making tool during the terminal stage of label-making may include printing the label (or otherwise creating a physical instantiation of the label) one or more times, storing the data obtained for the label's objects in a computer-readable storage medium, sending a message, configuring security settings associated with the label, etc.

In cases where the label-making tool sends a message, any suitable messaging format or protocol may be used, including, without limitation, Short Message Service (SMS) messages and/or email messages. The content of the message may be specified or selected by the label designer (e.g., when the label designer configures the label's workflow). In some embodiments, a portion of the message (e.g., the electronic address and/or name of the message recipient, the name of the user of the label-making tool, etc.) may be determined by the label-making tool based, for example, on data obtained by the data-acquisition actions for one or more of the label's objects. As just one example, for a label-making tool configured to generate visitor badges, the body of the message may include the statement, "<Visitor Name> is in the lobby," where <Visitor Name> is a parameter. The label designer may link the <Visitor Name> parameter to a text object in the label that is intended to be populated with the visitor's name. When the message is generated, the label-making tool may replace the <Visitor Name> parameter with the value of the linked object. As another example, for a label-making tool configured to generate visitor badges, the recipient field of the message may be linked to a text object in the label that is intended to be populated with the name of the visitor's host. When the message is generated, the label-making tool may replace the <Host> parameter with the address or phone number of the visitor's host, which may be determined based on the name of the visitor's host.

To configure security settings associated with a label, the label-making tool may, for example, encode security information on or in the label. As just one example, a label may be part of an identification badge that has an RFID tag, and the label-making tool may encode the security information in the RFID tag. Alternatively or in addition, the label-making tool may configure a security system to grant access to secure services, information (e.g., accounts), regions (e.g., areas of a facility), etc., in response to the system detecting the presence of the RFID tag with the encoded security information.

The foregoing examples of terminal actions performable by a label-making tool during the terminal stage of label-making are not limiting. In some embodiments, printing a label, storing label data, sending a message, and/or configuring security settings may be the only terminal actions that a label-making tool can perform. In some embodiments, other terminal actions are possible.

Figure 2C:
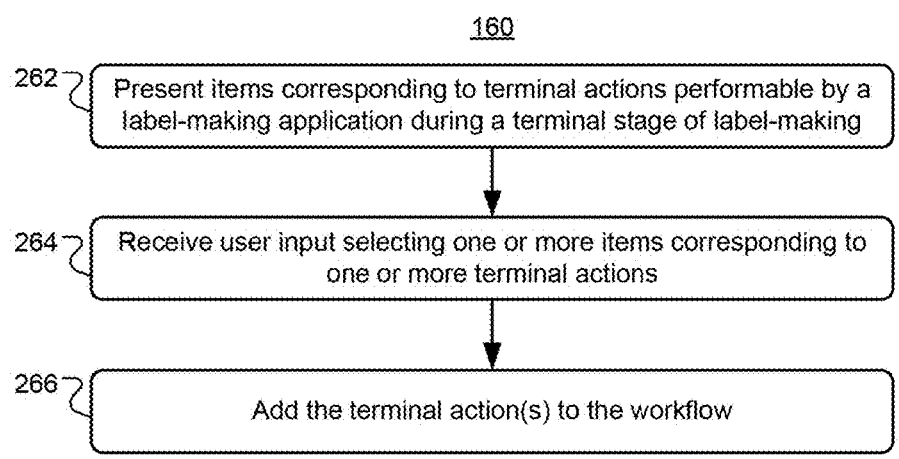
FIG. 2C is a flowchart of a sub-process for determining terminal actions of a workflow of a label-making tool, according to some embodiments.

FIG. 2C illustrates an embodiment of the third sub-process 160 for determining terminal actions to be performed by a label-making tool as part of a label-making workflow. In a first step 262, items corresponding to terminal actions performable by a label-making tool are presented. In a second step 264, user input is received, specifying at least one item corresponding to a terminal action. In a third step 266, the selected terminal action(s) may be added to the workflow. In some embodiments, the workflow may be configured to perform the terminal actions in the order the actions are added to the workflow. In some embodiments, the label designer may adjust, via a user interface, the order in which workflow performs the terminal actions.

The items corresponding to terminal actions may be presented and the input selecting the items may be received via a user interface of a computer. In some embodiments, the items may be presented via a selection component of the user interface, and the user may select the item(s) corresponding to terminal action(s) by interacting with the selection component. For example, in the first step 262, the system may present a selection component with items corresponding to printing a label, storing label data, sending a message, and/or configuring security settings.

In cases where the user configures the label-making tool to store label data during the terminal stage of label-making, the user may specify in step 264 which objects of the label are to be stored and/or where the label data is to be stored (e.g., a file, directory, database, or network-based storage service).

In cases where the user configures the label-making tool to send a message during the terminal stage of label-making, the user may configure the message in step 264. For example, the user may specify the type of message to be sent (e.g., text message, Short Message Service (SMS) message, email, automated telephone message, etc.), specify the message's content, parameterize the message's content and link the parameters to the values of label objects, etc. In some embodiments, the message content may include a virtual copy of the label with populated objects (e.g., an image of the label), the data populating one or more specified objects of the label, and/or any other suitable data.

In cases where the user configures the label-making tool to administer security settings associated with the label during the terminal stage of label-making, the user may provide information associated with the security system in step 264, including, without limitation, account information and/or credentials for accessing the security system.

Returning to FIG. 1A, after the template and/or the workflow of the label-making is/are determined, the system may save the label-making tool (e.g., by storing the template/workflow in a non-volatile computer-readable medium). In some embodiments, the saved tool is configured to perform the specified workflow to generate a label based on the template.

The sub-processes of the method 100 and the steps of the sub-processes may be performed in any suitable order. In some embodiments, the terminal actions of a workflow may be determined before the initial actions are determined. In some embodiments, the template and data-acquisition actions may be determined before determining the initial actions and/or the terminal actions. In some embodiments, the determination of the initial actions, the terminal actions, and the data-acquisition actions may be interleaved or performed in parallel. In some embodiments, the order of execution of the sub-processes of the method 100 and/or the steps of the sub-processes may be determined based on the user's interaction with the user interface.

In some embodiments, one or more sub-processes of the sub-process 104 may be omitted. For example, no initial actions may be identified.

Figure 4:
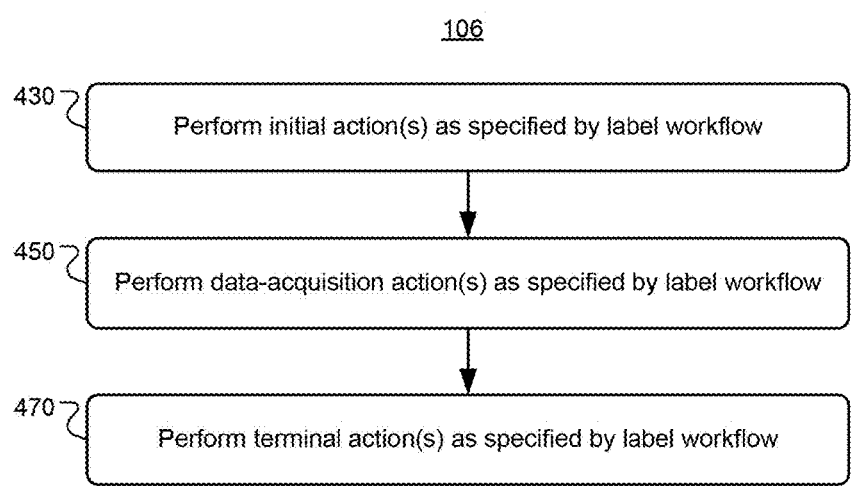
FIG. 4 is a flowchart of a sub-process for performing a label-making tool's workflow, in accordance with some embodiments.

Returning to FIG. 1A, in sub-process 106 the tool's workflow is performed to generated a label based on the tool's template. FIG. 4 illustrates a sub-process 106 for performing a tool's label-making workflow, in accordance with some embodiments. In some embodiments, the sub-process 106 includes steps of performing (430) one or more initial actions, performing (450) one or more data-acquisition actions, and performing (470) one or more terminal actions. Some embodiments of the steps of the sub-process 106 are described in further detail below.

Figure 5A:
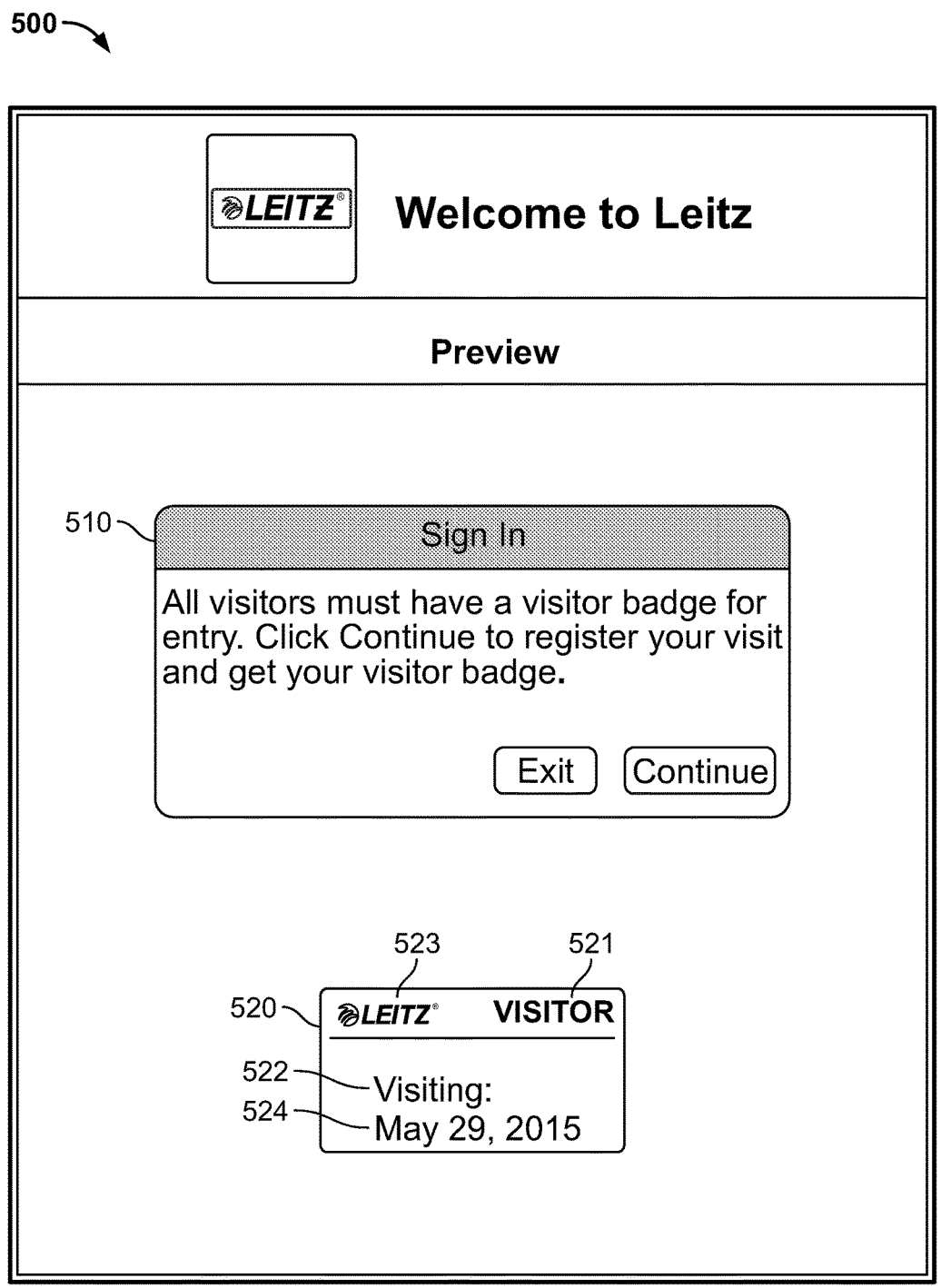
FIGS. 5A, 5B, 5C, and 5D show components of a user interface of a label-making tool, in accordance with some embodiments.

FIG. 5A shows an embodiment of a user interface 500 of a label-making tool. In the example of FIG. 5A, the user interface 500 includes a message dialog 510, which states: "All visitors must have a visitor badge for entry. Click Continue to register your visit and get your visitor badge." The tool may determine that a request to make a label has been received based on the user clicking the "Continue" button on the message dialog 510. Other techniques for receiving user input and for determining whether a label-making request has been received are possible.

In the example of FIG. 5A, the user interface 500 also includes a preview component 520, which shows a preview of the label being made. In some embodiments, the preview component is updated to show the label objects populated with data as the data is acquired. In the example of FIG. 5A, the preview of the label shows two text objects (521, 522) with the text "VISITOR" and "Visiting:", a graphics object 523 with a logo for "LEITZ", and a date object 524 with the date "May 29, 2015."

In step 430 of the sub-process 106, one or more initial actions may be performed (e.g., in an order specified by the label's workflow). The initial actions may include clearing data previously obtained by the label-making tool, presenting a message via a user interface, determining one or more properties of the label to be generated, determining the appearance of a label based on the label's properties, etc. Previously obtained data (e.g., user-specific data for one or more objects of a label) may be cleared using any suitable technique, including, without limitation, deleting the data, overwriting the data, freeing the memory allocated for the data, etc. A message may be presented using any suitable technique, including, without limitation, displaying the message (e.g., for text data and/or image data), playing back the message (e.g., for audio data and/or video data), synthesizing the message (e.g., text-to-speech synthesis), etc. A property of the label may be determined by presenting, via a user interface, a selection component including a finite set of items corresponding to label properties or property values, and receiving user input selecting at least one of the items corresponding to at least one of the label properties or property values. Determining the appearance of a label based on the label's properties may include, for example, populating one or more objects of the label, controlling the properties of an object's text (e.g., font, color, size, etc.), adjusting the geometry (e.g., position, size, orientation, etc.) of an object, or performing any other suitable operation based on the label's properties or property values.

In step 450 of the sub-process 106, one or more data-acquisition actions may be performed (e.g., in an order specified by the label's workflow). Some examples of data-acquisition actions are described above with reference to FIGS. 1C and 2B. In the interest of brevity, the description of some embodiments of data-acquisition actions is not repeated here. Some examples of data-acquisition actions are illustrated in FIGS. 5B, 5C, and 5D.

Figure 5B:
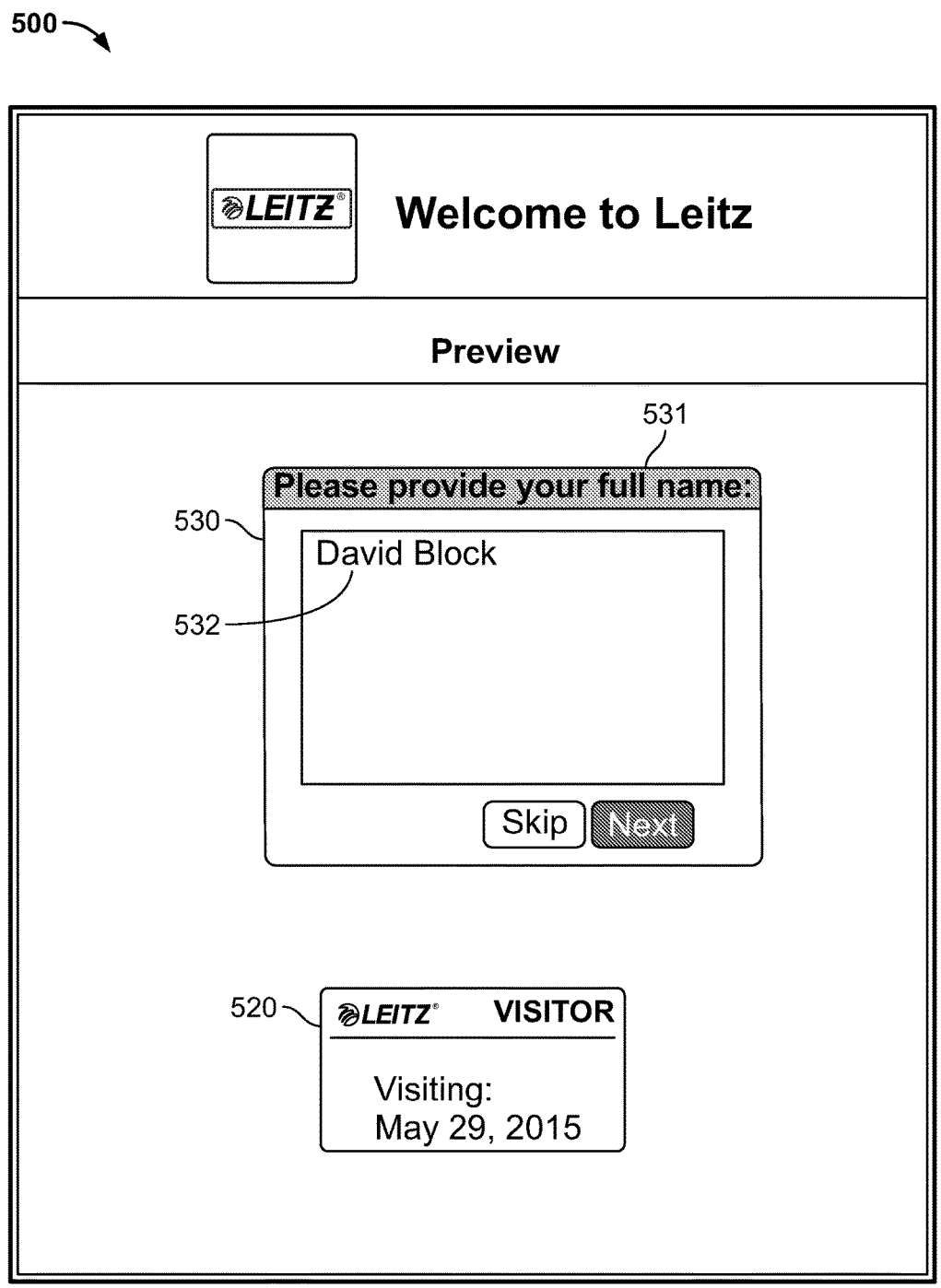

In the example of FIG. 5B, the user interface 500 includes a text entry dialog 530, which displays a message 531 prompting the user to enter his or her name, and includes a text entry component 532 where the user can key in his or her name. In the example of FIG. 5C, the preview component 520 has been updated to show the user's name in a text object 525.

Figure 5C:
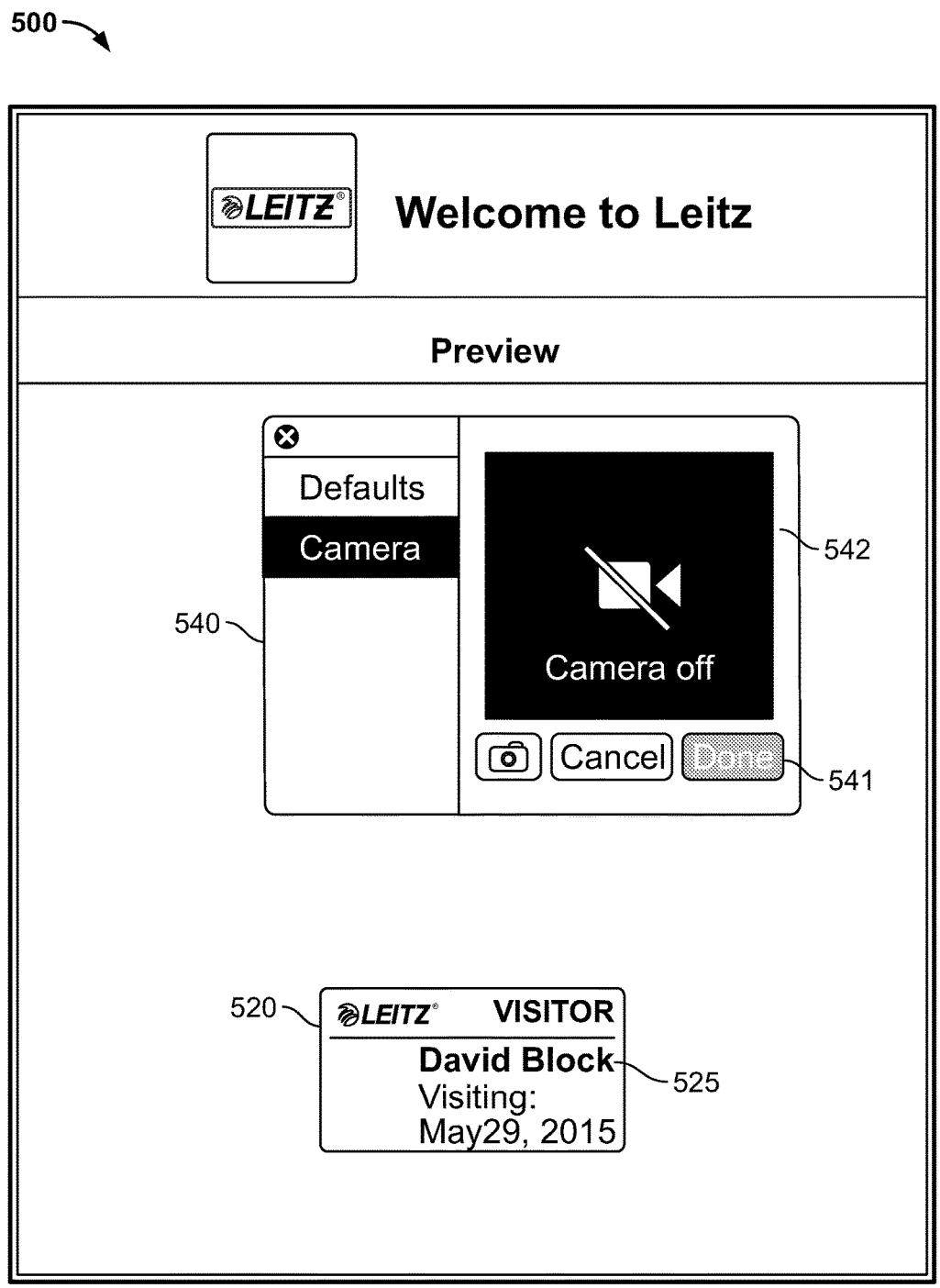

In the example of FIG. 5C, the user interface 500 includes an image capture component 540, with buttons 541 for controlling a camera and preview window 542 for viewing images captured by the camera. In the example of FIG. 5D, the preview component 520 has been updated to show the captured image of the user in a graphics object 526.

Figure 5D:
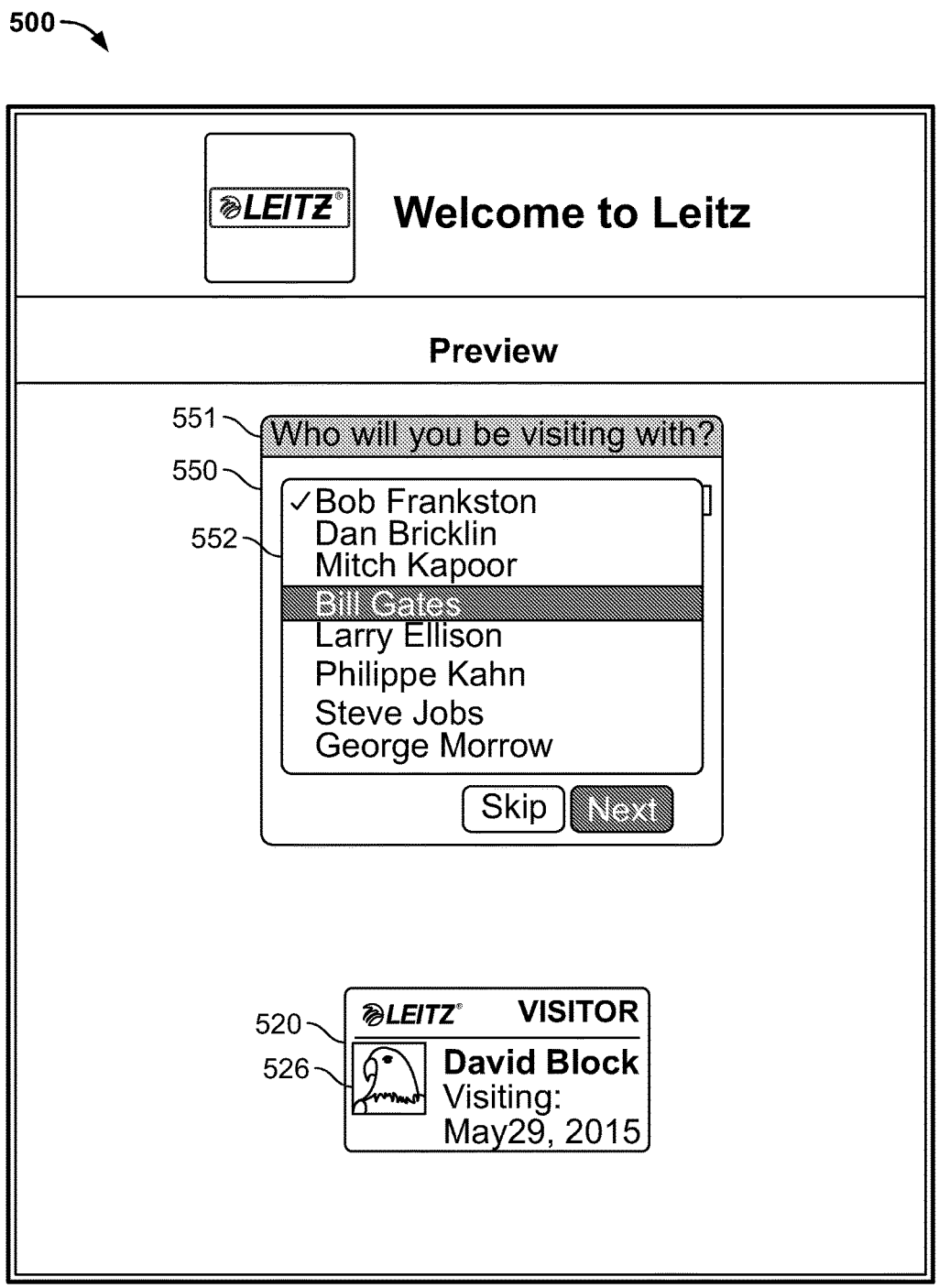

In the example of FIG. 5D, the user interface includes a list box 550 dialog, which displays a message 551 prompting the user to identify the person with whom the user will be visiting, and a list box component 552 for selecting that person's name.

Figure 5E:
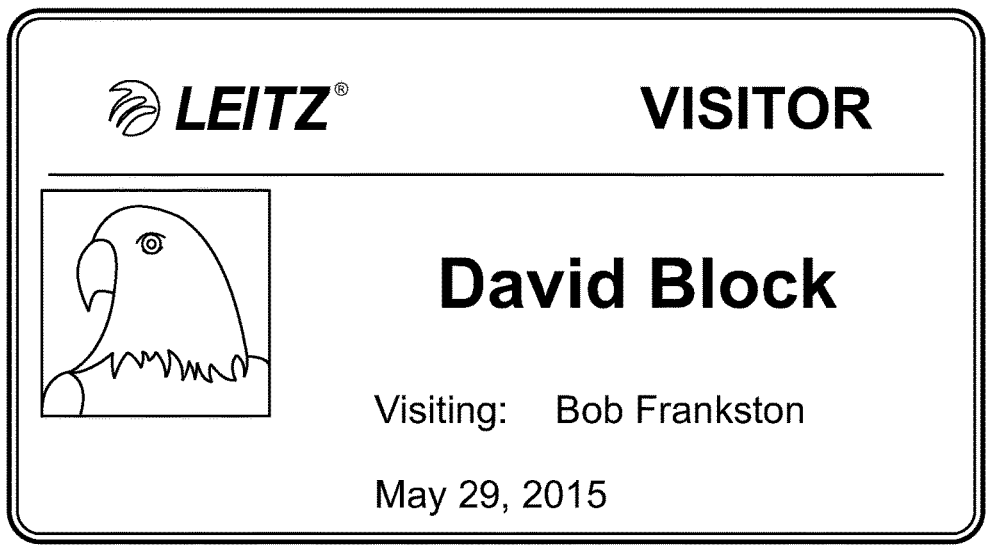
FIG. 5E shows an example of a label, in accordance with some embodiments.

In step 470 of the sub-process 106, one or more terminal actions may be performed (e.g., in an order specified by the label's workflow). In some embodiments, the label-making tool may perform the terminal action(s) automatically after the label-making workflow is completed, without requesting or requiring additional user input. The terminal actions may include printing the label (or otherwise creating a physical instantiation of the label), storing the data obtained for the label's objects in a computer-readable storage medium, sending a message to a specified recipient, configuring security settings associated with the label, etc. FIG. 5E shows an example of a printed label 560, in accordance with some embodiments.

In some embodiments, a label-making tool may perform the label-making workflow in a kiosk mode. When the label-making tool is in the kiosk mode, the user of the computing device executing the label-making tool may be prevented from interacting with any applications on the computing device other than the label-making tool, and prevented from changing the design of the tool's template and workflow. In some embodiments, when a user attempts to exit the kiosk mode, to interact with other applications on the computing device, or to change the configuration of the tool's template or workflow while the label-making tool is in the kiosk mode, the label-making tool may prompt the user to provide security information (e.g., credentials or authentication information). If the user is unable to provide the requested security information, the label-making tool may remain in the kiosk mode.

In some embodiments, the label-making sub-process 106 may be executed by a computer. Any suitable computer may be used, including, without limitation, a desktop computer, laptop computer, tablet, smartphone, or kiosk. In some embodiments, different portions of the label-making sub-process 100 may be performed by a client computer and remote server computer. In some embodiments, the computer performing the label-making sub-process 106 may be capable of communicating with a printer device to print a label, and/or capable of communicating with a security system to configure the security system's settings.

In some embodiments, the label-generating sub-process 106 may be omitted from the method 100. In such cases, the method 100 may be a method for configuring a label-making tool. In some embodiments, the template-determining sub-process 102 and the label-generating sub-process 106 may be omitted from the method 100. In such cases, the method 100 may be a method for adding a label-making workflow to a label template. In some embodiments, the template-determining sub-process 102 and the workflow-determining sub-process 104 may be omitted from the method 100. In such cases, the method 100 may be a method for using a label template and a label-making workflow to generate a label.

Further Description of Some Embodiments

Some embodiments of the methods (e.g., the method 100 for generating a label), sub-processes, and operations described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 6:
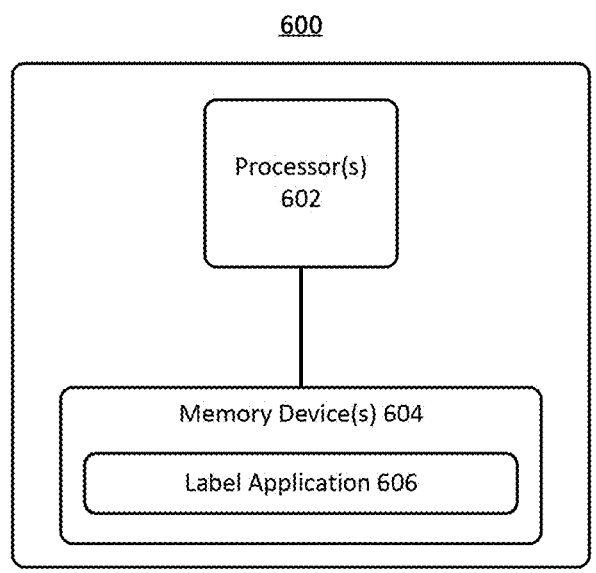
FIG. 6 is a block diagram of a computer, in accordance with some embodiments.

FIG. 6 shows a block diagram of a computer 600. The elements of the computer 600 include one or more processors 602 for performing actions in accordance with instructions and one or more memory devices 604 for storing instructions and data. In some embodiments, the computer 600 executes a label application 606. In some embodiments, the label application implements a method for generating a label or a method for generating a label-making tool. In some embodiments, the label application implements a sub-process 106 for performing a workflow to generate a label based on a template. Different versions of the label application 606 may be stored, distributed, or installed. Some versions of the software may implement only some embodiments of the methods described herein. The method for generating a label-making tool and the sub-process for performing the tool's workflow to generate a label based on a template may be performed by different data processing apparatus.

Generally, a computer 600 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

TERMINOLOGY

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for adapting a label-making tool, the method comprising:
presenting, via a first user interface, a selection component including a finite set of items corresponding to respective types of label objects, including a first item corresponding to a first type of label object;
receiving a first user input selecting the first item corresponding to the first type of label object;
based on the first user input, adapting a label template of the label-making tool to include a first label object of the first type;
identifying, based on the first type of the first label object, a finite set of data-acquisition actions performable by the label-making tool to obtain data for the first label object and to populate the first label object with the obtained data in labels generated using the label template;
presenting, via the first user interface, a selection component including a finite set of items corresponding to the finite set of data-acquisition actions, including a second item corresponding to a first data-acquisition action performable by the label-making tool to obtain data for the first label object in labels generated using the label template;
receiving a second user input selecting the second item corresponding to the first data-acquisition action; and
based on the second user input, adapting a workflow associated with the label template to use the first data-acquisition action to obtain data for the first label object and to populate the first label object with the obtained data, wherein the label-making tool is configured to execute the adapted workflow to perform operations including:
displaying, via a second user interface different from the first user interface, a view of a label corresponding to the label template,
obtaining data for the first label object of the label template and populating the first label object with the obtained data by performing the first data-acquisition action, and
generating a label including the obtained data.

2. The method of claim 1, wherein the label-making tool comprises the label template and the workflow, and wherein the workflow is performable to generate labels based on the template.

3. The method of claim 1, wherein the types of label objects comprise at least one of an address type, a text type, a code type, a date type, a time type, a date/time type, a counter type, and a graphics type.

4. The method of claim 3, wherein the first type of the first label object is the address type, and wherein the data-acquisition actions performable to obtain data for the first label object comprise at least one of receiving keyed input representing an address, receiving speech input representing an address, scanning a business card and extracting an address from the scanned business card, and retrieving an address from a data set.

5. The method of claim 3, wherein the first type of the first label object is the text type, and wherein the data-acquisition actions performable to obtain data for the first label object comprise at least one of receiving keyed input, receiving speech input, receiving user input selecting a text item from a finite set of text items, and receiving user input selecting a data source.

6. The method of claim 3, wherein the first type of the first label object is the code type, wherein the data-acquisition actions performable to obtain data for the first label object comprise at least one of receiving keyed input, receiving user input selecting an item from a finite set of items, and receiving user input selecting a data source, and wherein generating a label including the obtained data comprises generating a label including a code based on the obtained data.

7. The method of claim 6, wherein the data source comprises a second label object of the label.

8. The method of claim 3, wherein the first type of the first label object is the date type, and wherein the data-acquisition actions performable to obtain data for the first label object comprise at least one of querying a computer system for a current date, calculating a date range based on the current date, calculating a second date based on the current date, and receiving user input representing a date.

9. The method of claim 3, wherein the first type of the first label object is the time type, and wherein the data-acquisition actions performable to obtain data for the first label object comprise at least one of querying a computer system for a current time-of-day, calculating a time range based on the current time-of-day, calculating a second time-of-day based on the current time-of-day, and receiving user input representing a time-of-day.

10. The method of claim 3, wherein the first type of the first label object is the date/time type, and wherein the data-acquisition actions performable to obtain data for the first label object comprise at least one of querying a computer system for a current date, querying a computer system for a current time-of-day, calculating a date range based on the current date, calculating a time range based on the current time-of-day, calculating a second date based on the current date, calculating a second time-of-day based on the current time-of-day, receiving user input representing a date, and receiving user input representing a time-of-day.

11. The method of claim 3, wherein the first type of the first label object is the counter type, and wherein the data-acquisition actions performable to obtain data for the first label object include loading a counter value, generating the data based on the counter value, changing the counter value, and storing the changed counter value.

12. The method of claim 3, wherein the first type of the first label object is the graphics type, and wherein the data-acquisition actions performable to obtain data for the first label object comprise at least one of obtaining an image by activating a camera and receiving user input selecting an image from a finite set of images.

13. The method of claim 1, wherein the operations further include obtaining other data for another label object by performing a corresponding data-acquisition action, and wherein the generated label further includes the other data.

14. The method of claim 1, further comprising:
presenting, via the first user interface, a selection component including a finite set of items corresponding to respective initial actions performable prior to performing the first data-acquisition action;
receiving user input selecting at least one of the items corresponding to at least one of the initial actions; and
adapting the label-making tool to perform the initial action(s) prior to performing the first data-acquisition action.

15. The method of claim 14, wherein the initial action(s) are selected from the group consisting of clearing data previously obtained for the label, clearing data previously obtained for the first label object, displaying, via the second user interface, a message dialog component, and determining a property of the label.

16. The method of claim 15, wherein determining the property of the label comprises:
presenting, via another user interface, a selection component including a finite set of items corresponding to respective properties of labels; and
receiving user input selecting at least one of the items corresponding to at least one of the label properties.

17. The method of claim 1, further comprising adapting the label-making tool to control an appearance of the label based, at least in part, on a property of the label.

18. The method of claim 1, further comprising:
presenting, via the first user interface, user interface items corresponding to respective terminal actions performable subsequent to performing the first data-acquisition action;
receiving user input selecting at least one of the user interface items corresponding to at least one of the terminal actions; and
adapting the label-making tool to perform the terminal action(s) subsequent to performing the first data-acquisition action.

19. The method of claim 18, wherein the terminal action(s) comprise at least one of storing data obtained for the label and sending a message to a specified user.

20. The method of claim 1, wherein the label-making tool is further configured to execute in a kiosk mode in which the label-making tool prompts a user for security data in response to the user attempting to terminate execution of the label-making tool.

21. The method of claim 1, wherein the finite set of data-acquisition actions are performable by the label-making tool to obtain data for the first label object from respective data sources corresponding to the finite set of respective items.

22. A system comprising:
at least one data processing device programmed to perform acts comprising:
presenting, via a first user interface, a selection component including a finite set of items corresponding to respective types of label objects, including a first item corresponding to a first type of label object;
receiving a first user input selecting the first item corresponding to the first type of label object;
based on the first user input, adapting a label template of the label-making tool to include a first label object of the first type;
identifying, based on the first type of the first label object, a finite set of data-acquisition actions performable by a label-making tool to obtain data for the first label object and to populate the first label object with the obtained data in labels generated using the label template;
presenting, via the first user interface, a selection component including a finite set of items corresponding to the finite set of data-acquisition actions, including a second item corresponding to a first data-acquisition action performable by the label-making tool to obtain data for the first label object in labels generated using the label template;
receiving a second user input selecting the second item corresponding to the first data-acquisition action; and
based on the second user input, adapting a workflow associated with the label template to use the first data-acquisition action to obtain data for the first label object and to populate the first label object with the obtained data, wherein the label-making tool is configured to execute the adapted workflow to perform operations including:
displaying, via a second user interface different from the first user interface, a view of a label corresponding to the label template,
obtaining data for the first label object of the label template and populating the first label object with the obtained data by performing the first data-acquisition action, and
generating a label including the obtained data.

23. The system of claim 22, wherein the label-making tool comprises the label template and the workflow, and wherein the workflow is performable to generate labels based on the template.

24. The system of claim 22, wherein the types of label objects comprise at least one of an address type, a text type, a code type, a date type, a time type, a date/time type, a counter type, and a graphics type.

25. The system of claim 22, wherein the acts further comprise:
presenting, via the first user interface, a selection component including a finite set of items corresponding to respective initial actions performable prior to performing the first data-acquisition action;
receiving user input selecting at least one of the items corresponding to at least one of the initial actions; and
adapting the label-making tool to perform the initial action(s) prior to performing the first data-acquisition action.

26. The system of claim 25, wherein the initial action(s) are selected from the group consisting of clearing data previously obtained for the label, clearing data previously obtained for the first label object, displaying, via the second user interface, a message dialog component, and determining a property of the label.

27. The system of claim 22, wherein the acts further comprise:
presenting, via the first user interface, user interface items corresponding to respective terminal actions performable subsequent to performing the first data-acquisition action;
receiving user input selecting at least one of the user interface items corresponding to at least one of the terminal actions; and
adapting the label-making tool to perform the terminal action(s) subsequent to performing the first data-acquisition action.

28. The system of claim 27, wherein the terminal action(s) comprise at least one of storing data obtained for the label and sending a message to a specified user.

29. A non-transitory computer-readable storage medium having instructions stored thereon that, when executed by a data processing device, cause the data processing device to perform acts comprising:
presenting, via a first user interface, a selection component including a finite set of items corresponding to respective types of label objects, including a first item corresponding to a first type of label object;

receiving a first user input selecting the first item corresponding to the first type of label object;

based on the first user input, adapting a label template of the label-making tool to include a first label object of the first type;

identifying, based on the first type of the first label object, a finite set of data-acquisition actions performable by a label-making tool to obtain data for the first label object and to populate the first label object with the obtained data in labels generated using the label template;

presenting, via the first user interface, a selection component including a finite set of items corresponding to the finite set of data-acquisition actions, including a second item corresponding to a first data-acquisition action performable by the label-making tool to obtain data for the first label object in labels generated using the label template;

receiving a second user input selecting the second item corresponding to the first data-acquisition action; and based on the second user input, adapting a workflow associated with the label template to use the first data-acquisition action to obtain data for the first label object and to populate the first label object with the obtained data, wherein the label-making tool is configured to execute the adapted workflow to perform operations including:

displaying, via a second user interface different from the first user interface, a view of a label corresponding to the label template, obtaining data for the first label object of the label template and populating the first label object with the obtained data by performing the first data-acquisition action, and generating a label including the obtained data.

30. The storage medium of claim 29, wherein the label-making tool comprises the label template and the workflow, and wherein the workflow is performable to generate labels based on the template.

31. The storage medium of claim 29, wherein the types of label objects comprise at least one of an address type, a text type, a code type, a date type, a time type, a date/time type, a counter type, and a graphics type.

32. The storage medium of claim 29, wherein the acts further comprise:

presenting, via the first user interface, a selection component including a finite set of items corresponding to respective initial actions performable prior to performing the first data-acquisition action;

receiving user input selecting at least one of the items corresponding to at least one of the initial actions; and adapting the label-making tool to perform the initial action(s) prior to performing the first data-acquisition action.

33. The storage medium of claim 32, wherein the initial action(s) are selected from the group consisting of clearing data previously obtained for the label, clearing data previously obtained for the first label object, displaying, via the second user interface, a message dialog component, and determining a property of the label.

34. The storage medium of claim 29, wherein the acts further comprise:

presenting, via the first user interface, user interface items corresponding to respective terminal actions performable subsequent to performing the first data-acquisition action;

receiving user input selecting at least one of the user interface items corresponding to at least one of the terminal actions; and adapting the label-making tool to perform the terminal action(s) subsequent to performing the first data-acquisition action.

35. The storage medium of claim 34, wherein the terminal action(s) comprise at least one of storing data obtained for the label and sending a message to a specified user.

* * * * *